US010106091B2

United States Patent
Da Costa Pito et al.

(10) Patent No.: US 10,106,091 B2
(45) Date of Patent: Oct. 23, 2018

(54) SUPPORT FOR A PORTABLE ELECTRONIC APPARATUS, PARTICULARLY IN A VEHICLE, SET COMPRISING SUCH A SUPPORT AND AN ELECTRONIC APPARATUS, ASSOCIATED RETENTION PROCESS

(71) Applicant: Faurecia Interieur Industrie, Nanterre (FR)

(72) Inventors: Sergio Da Costa Pito, Courdimanche (FR); Bruno Dinant, Saint-Brice-Sous-Foret (FR)

(73) Assignee: Faurecia Interieur Industrie, Nanterre (FR)

( * ) Notice: Subject to any disclaimer, the term of this patent is extended or adjusted under 35 U.S.C. 154(b) by 502 days.

(21) Appl. No.: 14/964,485

(22) Filed: Dec. 9, 2015

(65) Prior Publication Data
US 2016/0167586 A1    Jun. 16, 2016

(30) Foreign Application Priority Data

Dec. 15, 2014 (FR) ..................................... 14 62416

(51) Int. Cl.
*B60R 9/00* (2006.01)
*B60R 11/00* (2006.01)
(Continued)

(52) U.S. Cl.
CPC ................ *B60R 7/04* (2013.01); *B60R 11/02* (2013.01); *B60R 11/0241* (2013.01);
(Continued)

(58) Field of Classification Search
CPC ... B60R 7/04; B60R 11/02; B60R 2011/0003; B60R 11/0241; B60R 2011/0071; F16M 11/041; F16M 13/00
(Continued)

(56) References Cited

U.S. PATENT DOCUMENTS 5,033,709 A * 7/1991 Yuen .................... B60R 11/0241
224/558
5,187,744 A * 2/1993 Richter ............... B60R 11/0241
224/553
(Continued)

FOREIGN PATENT DOCUMENTS

DE      29822428 U1    4/1999

OTHER PUBLICATIONS

French Search Report for corresponding application No. 14 62416 dated May 13, 2015, 2 pages, not translated.
Written Opinion for corresponding application No. 14 62416 dated May 13, 2015, 4 pages, not translated.

*Primary Examiner* — Nathan J Newhouse
*Assistant Examiner* — Lester L Vanterpool
(74) *Attorney, Agent, or Firm* — Reising Ethington P.C.

(57) ABSTRACT

A support for a portable electronic apparatus. The support includes a first edge and a second edge, a locking device movable between a locking position, in which it prevents the translation of the first edge relative to the second edge, and an unlocking position, and an actuating device for actuating the locking device movable between an inactive position and an active position in which the actuating device keeps the locking device in its unlocking position. Movement of the second edge from an idle position to a maintaining position drives the actuating device from its active position to its inactive position. The support includes a control device that, when moved from a released position to a disengagement position, causes the actuating device to go from its inactive position to its active position while keeping the second edge in its maintaining position.

10 Claims, 5 Drawing Sheets

(51) Int. Cl.

| | |
|---|---|
| *B60R 7/04* | (2006.01) |
| *B60R 11/02* | (2006.01) |
| *F16M 11/04* | (2006.01) |
| *F16M 13/00* | (2006.01) |
| *H04M 1/04* | (2006.01) |

(52) U.S. Cl.
CPC .......... *F16M 11/041* (2013.01); *F16M 13/00* (2013.01); *H04M 1/04* (2013.01); *B60R 2011/0003* (2013.01); *B60R 2011/0071* (2013.01)

(58) Field of Classification Search
USPC ................. 224/570, 567, 571, 929; 379/454
See application file for complete search history.

(56) References Cited

U.S. PATENT DOCUMENTS

| | | | |
|---|---|---|---|
| 6,085,113 A | 7/2000 | Fan | |
| 8,177,111 B2 * | 5/2012 | Yeh | B60R 11/0247 224/483 |
| 2002/0009195 A1 * | 1/2002 | Schon | B60R 11/0241 379/454 |
| 2007/0019387 A1 * | 1/2007 | Schipper | B60R 11/0252 361/725 |
| 2015/0137760 A1 * | 5/2015 | Yang | F16M 11/041 320/115 |
| 2015/0137761 A1 * | 5/2015 | Yang | F16M 11/041 320/115 |

* cited by examiner

SUPPORT FOR A PORTABLE ELECTRONIC APPARATUS, PARTICULARLY IN A VEHICLE, SET COMPRISING SUCH A SUPPORT AND AN ELECTRONIC APPARATUS, ASSOCIATED RETENTION PROCESS

TECHNICAL FIELD

The present invention relates to a support for a portable electronic apparatus, in particular in a vehicle, comprising a first edge and a second edge, a locking device, and an actuating device. The first edge is movable relative to the second edge. The locking device is movable between a locking position, in which it prevents the translation of the first edge relative to the second edge, and an unlocking position, in which it allows the movement of the first edge relative to the second edge. The locking device is constrained toward its locking position. The actuating device is used for actuating the locking device movable between an inactive position in which the locking device is in its locking position and an active position in which the actuating device keeps the locking device in its unlocking position. The second edge is movable between an idle position, in which the second edge is able to keep the actuating device in its active position, and a maintaining position. The transition of the second edge from its idle position to its maintaining position causes the movement of the actuating device from its active position to its inactive position, with the actuating device being kept in its inactive position by the second edge in its maintaining position.

The invention further relates to an assembly comprising such a support and an electronic apparatus.

BACKGROUND

A growing number of mobile electronic apparatuses having a large number of functionalities are available to users, and in particular motor vehicle drivers.

In particular, apparatuses of the mobile telephone type, in particular smartphones, geolocation apparatuses, in particular using GPS (Global Positioning System), or personal digital assistants (PDA), for example make it possible to help a motor vehicle driver determine a route or assist him in driving the vehicle.

Such apparatuses are for example controlled using a touchscreen that must be accessible to the driver, but without requiring the driver to hold the device, which would be dangerous for driving the vehicle.

Thus, it is known to provide a support for the electronic apparatus close to the driver, for example on the dashboard or on the windshield of the motor vehicle, in order to maintain the apparatus there while leaving the screen free so that it can be controlled without holding it.

Faced with the diversity of these devices, and in particular their size, it is known to provide an adjustable support adapting to different types of apparatuses, in particular in terms of height. To that end, the support generally comprises retaining means for retaining the lower edge and the upper edge of the electronic apparatus. The means for retaining the upper edge or the lower edge are adjustable heightwise so as to adapt the support to the height of the apparatus received by the support.

In order to secure the apparatus and prevent it from being ejected upon an impact, it is known to lock the retaining means, so as to prevent them from separating. The known systems use manual locking, thus the user must lock the retaining means himself to secure the apparatus. Such a solution, in addition to being a constraint for the user, carries a significant risk that the device might unintentionally move from its place on the adjustable support. There is indeed a high risk that the user will forget to lock the retaining means of the support after placing the apparatus.

One aim of the invention is to propose an electronic apparatus support that is safe, practical and easy to use.

SUMMARY

To that end, the present invention relates to a support for a portable electronic apparatus, in particular in a motor vehicle, characterized in that it further comprises a control device movable between a released position and a disengagement position, the transition of the control device from its released position to its disengagement position causing the actuating device to go from its inactive position to its active position while keeping the second edge in its maintaining position.

Such a support allows automatic locking, once the apparatus is installed between the two edges, and manual unlocking. Indeed, during the placement of the apparatus, the second edge of the support is moved from an idle position to a maintaining position, which causes the actuating device to go from the active position to the inactive position, which causes locking of the locking device. The electronic apparatus is thus maintained between the two edges whose translation is locked. The locking therefore does not require any particular intervention by the user aside from the placement of the apparatus. When the apparatus is removed, the user presses on the control device, which goes from its released position to its disengagement position, thus causing activation of the actuating device, which causes the locking device to go to its unlocked position. Furthermore, the second edge is kept in its maintaining position and the control device remains in its disengagement position as long as the apparatus remains between the two edges, which offers great safety of use.

The support may include one or more of the following features, considered alone or according to any technically possible combination(s):

- the transition of the actuating device from its active position to its inactive position causes the control device to go from its disengagement position to its released position;
- the transition of the control device from its disengagement position to its released position requires the passage of the second edge from the idle position to the maintaining position;
- the actuating device is rotatable between the inactive position and the active position around an axis and the actuating device comprises a first arm extending in a first direction from a first end to a connecting end, and a second arm extending in a second direction different from the first direction of the connecting end of the first arm to a second free end, the second arm being secured in rotation with the first arm relative to the axis;
- the second edge includes a rear surface facing the actuating device, the actuating device comprising a locking pin movable between a retracted position and a deployed position and being constrained toward the deployed position by a force, the constraint force exerted being adapted so that, when the locking pin is deployed against the rear surface of the second edge, the second edge is secured in rotation with the actuating device;

the support includes a stationary part and the second edge, in its maintaining position, defines, with the stationary part, a space for receiving the locking pin, the passage of the control device from its released position to its disengagement position causing the deployment of the locking pin in the receiving space, so as to keep the actuating device in its active position;

the control device is in its released position only when the second edge is in the maintaining position;

the first edge is translatable relative to the second edge between a close position and a separated position, the first edge being constrained toward the closed position;

the control device comprises a lug, the lug being in contact with the actuating device.

The invention also relates to an interior vehicle assembly comprising a support as described above.

BRIEF DESCRIPTION OF THE DRAWINGS

Other aspects and advantages of the invention will appear upon reading the following description, provided solely as an example, and done in reference to the appended drawings, in which.

DETAILED DESCRIPTION

In the description, the term "longitudinal" is defined relative to the length of an electronic apparatus and the term "transverse" is defined relative to the width of that apparatus.

The main direction X is the bearing direction of the apparatus. It for example corresponds to the direction defined relative to the length of the apparatus. The terms "top", "bottom", "lower" and "upper" are to be understood relative to that direction.

The transverse direction Y is the direction perpendicular to the main direction X defined relative to the width of that apparatus.

The depth direction Z is perpendicular to the main and transverse directions and defined relative to the thickness "e" of the apparatus. The terms "front" and "rear" are to be understood relative to that direction.

A support 1 according to an embodiment of the invention is shown in FIGS. 1 to 5.

The support 1 is designed to maintain portable electronic apparatuses 4 in a vehicle, in particular a motor vehicle.

The electronic apparatus 4 is, for example, a mobile telephone, digital tablet, personal digital assistant, geolocation apparatus, or another device.

Figure 3:
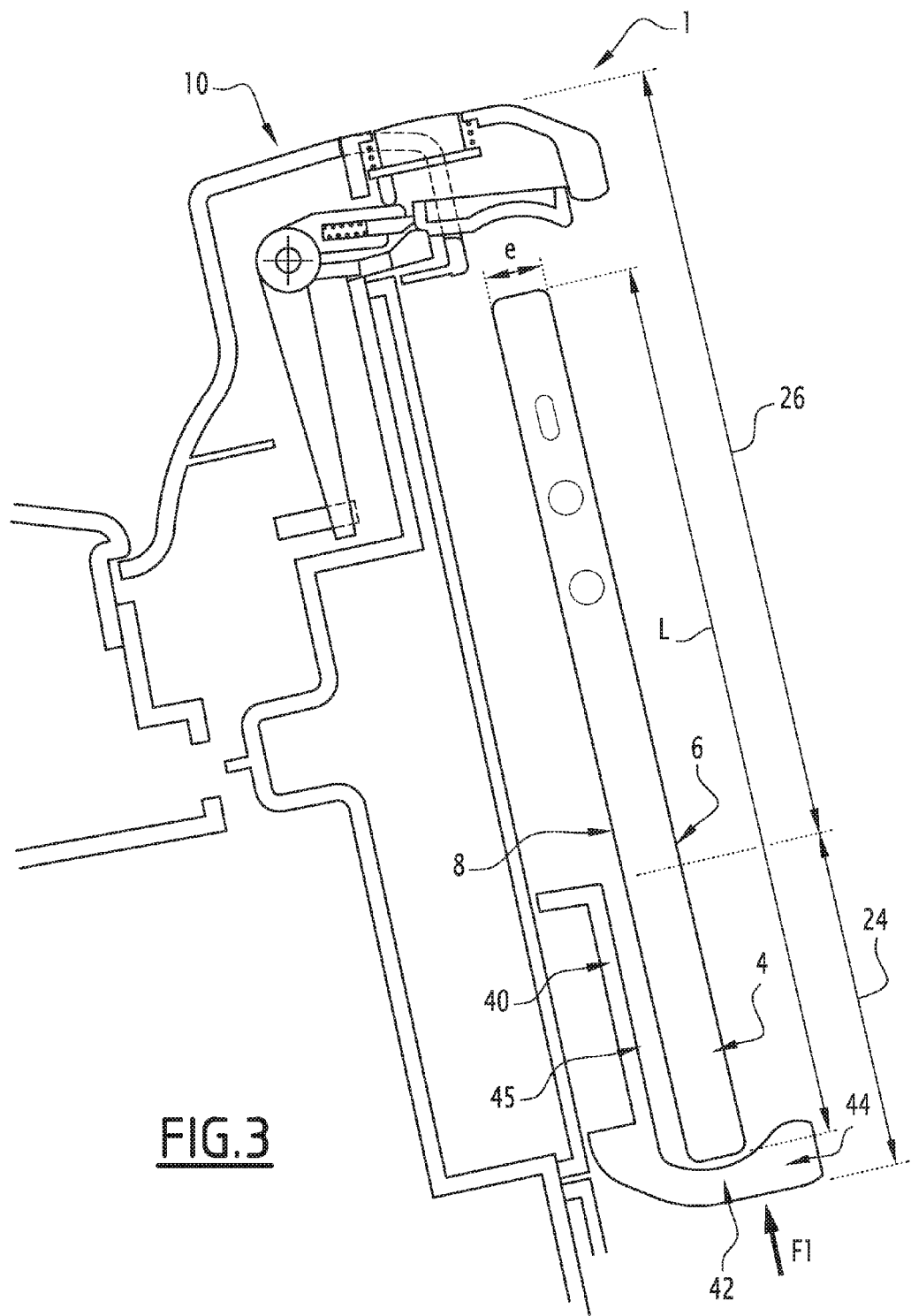
FIG. 3 is a view similar to FIG. 2, the assembly comprising the support of FIG. 1 and an electronic apparatus during a placement step of the apparatus.
Figure 4:
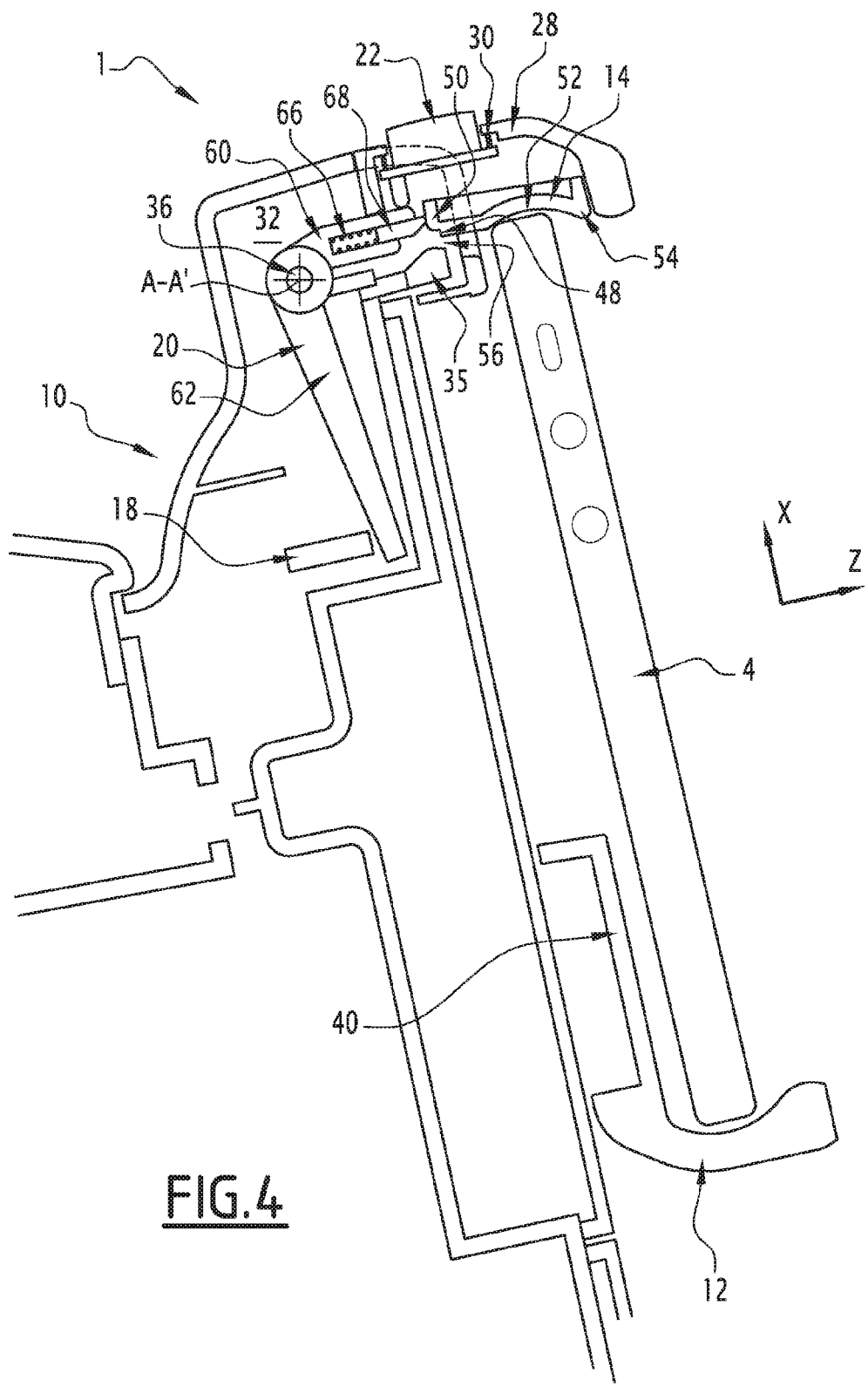
FIG. 4 is a view similar to FIG. 2 of the assembly when the support is in a maintaining configuration of the apparatus.
Figure 5:
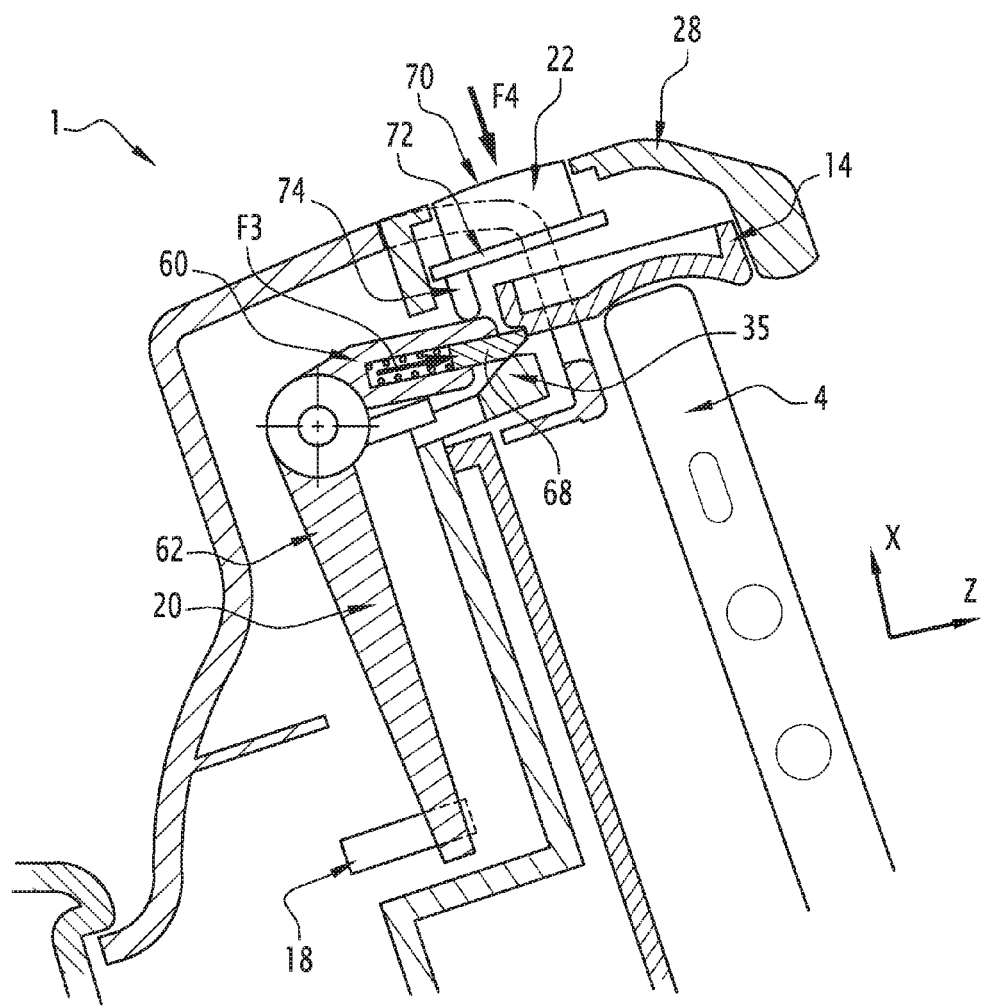
FIG. 5 is a view similar to FIG. 2 of the assembly with the support in a configuration for removal of the apparatus.

As shown in FIGS. 3 to 5, the apparatus 4 traditionally has an elongated parallelepiped shape and comprises a front face 6 and a rear face 8, framed by lateral edges.

The front face 6 is, for example, provided with a display screen. The screen is, for example, a touchscreen also making it possible to control the apparatus 4 by contact with the screen.

The apparatus 4 has a thickness e defined by the distance separating the front face 6 from the rear face 8, a length L corresponding to its dimension along the longest edges and a width corresponding to its dimension along the lateral edges.

The support 1 is designed to be situated on the dashboard of a motor vehicle, for example near the driver, or on another surface of the passenger compartment of the vehicle.

The support 1 is able to receive electronic apparatuses 4 with different dimensions L, 1 and e. In other words, the support is "universal" because it is able to receive different models of portable electronic apparatuses 4.

The support 1 comprises a base 10, a first edge 12 retaining the apparatus 4 and a second edge 14 retaining the apparatus 4. The support 1 defines a receiving space 16 for receiving the apparatus 10 between the first edge 12 and the second edge 14.

The support 1 further comprises a locking device 18 for locking the translation of the first edge 12 relative to the second edge 14, an actuating device 20 for the locking device 18 and a control device 22 for unlocking the translation of the first edge 12 relative to the second edge 14.

Figure 2:
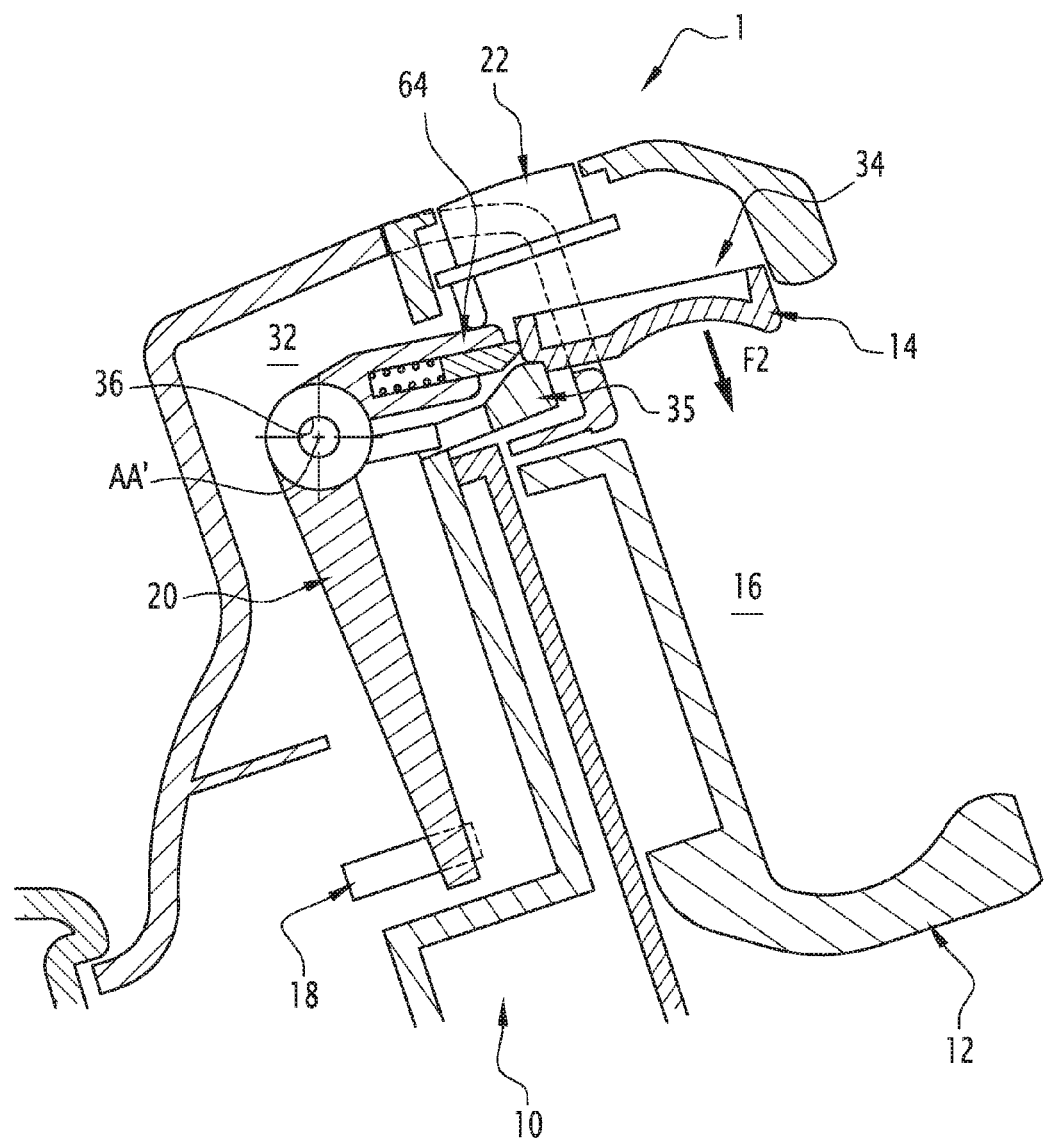
FIG. 2 is a diagrammatic sectional illustration along plane II-II of FIG. 1 of the support in an idle configuration.

The support 1 can be maneuvered between an idle configuration shown in FIG. 2, a configuration maintaining the apparatus shown in FIG. 4, and a removal configuration shown in FIG. 5.

The base 10 is for example fastened on the dashboard of the motor vehicle.

The base 10 comprises a lower part 24 and an upper part 26.

According to the embodiment shown in FIGS. 1 to 5, the lower part 24 bears the first edge 12 and the upper part bears the second edge 14.

The upper part 26 for example comprises a trim surface 28 that extends in a plane transverse to the main direction X. The trim surface 28 is visible and accessible from a passenger compartment of the vehicle. The trim surface 28 advantageously covers the inside of the base 10 so as, for example, to hide the actuating device 20 from the user.

The trim surface 28 defines an orifice 30 designed to receive the control device 22. The size of the orifice 30 is adapted to the control device 22.

The base 10 defines at least one housing 32 designed to receive the second edge 14, the locking device 18 and the actuating device 20 and to allow their mobility. The housing 32 emerges toward the passenger compartment via the orifice 30 and via an opening 34 situated in the upper part 26 facing the first edge 12.

The lower edge of the opening 34 is for example delimited by a stationary part 35 of the base 10.

The base 10 further comprises, in the upper part 26, a rod 36 extend along a transverse axis A-A' in the transverse direction Y. The rod 36 is designed to serve as a rotation axis of the actuating device 20 and the second edge 14, as will be described below.

The lower part 24 of the base 10 comprises at least one shaft 38. In the example illustrated in FIG. 1, the base 10 includes two parallel shafts 38 situated along the transverse edge of the base.

The shaft 38 for example extends along the main direction X.

The first edge 12 is mounted on the base 10 by means of at least one deployment arm 40.

The shaft 38 is designed to receive the deployment arm 40 and guide its translation along the main direction.

The height of the shaft 38 is fixed. The height of the shaft 38 is advantageously comprised between 100 and 110 millimeters (mm).

According to the embodiment shown in FIGS. 1 to 5, the first edge 12 is designed to lock a lower edge of the electronic apparatus in the maintaining configuration.

The first edge 12 is translatable by means of the shaft 38 between a close position of the second edge 14, shown in FIG. 2, and a separated position of the second edge, shown in FIG. 3.

The distance between the first edge 12 and the second edge 14 is variable so as to adapt to the dimension L of the electronic apparatus 4.

Furthermore, there is an elastic return means constraining the first edge 12 toward the closed position.

The elastic return means for example exerts a force F1 oriented toward the second edge 14 in the main direction. The first edge 12 includes the deployment arm 40, a stop surface 42 and a shoulder 44.

The deployment arm 40 is translatable in the shaft 38 between a plurality of maintaining positions of the apparatus 10. In other words, the deployment arm 40 is able to slide in its shaft 38 and be locked in a plurality of maintaining positions.

The deployment arm 40 for example has a bearing surface 45.

The bearing surface 45 is planar. The bearing surface 45 is for example designed to be in contact with the rear face 8 of the apparatus 4 when the latter is installed in the support 1, such that the front face 6 of the apparatus 4 is visible and accessible from the passenger compartment of the motor vehicle.

The stop surface 42 is for example substantially curved and protrudes perpendicular to the bearing surface 45, at the lower edge of the bearing surface 45.

The shoulder 44 is able to keep the apparatus 4 in position on the first edge 12. The shoulder 44 protrudes from the stop surface 42 of the apparatus 4 and is arranged to retain the lower edge of the apparatus 4.

According to the embodiment shown in FIGS. 1 to 5, the second edge 14 is designed to block the upper edge of the electronic apparatus 4 in the maintaining configuration and the removal configuration.

The second edge 14 is movable relative to the base between the maintaining position of the apparatus illustrated in FIGS. 4 and 5, and an idle position illustrated in FIGS. 2 and 3. The second edge 14 for example pivots between the maintaining position of the apparatus 4 and the idle position.

The second edge 14 for example has a front part designed to come into contact with the apparatus 4 and a rear part allowing it to catch on the base 10 and allowing its mobility. The rear part of the second edge 14 is mounted rotating around the rod 36.

Figure 1:
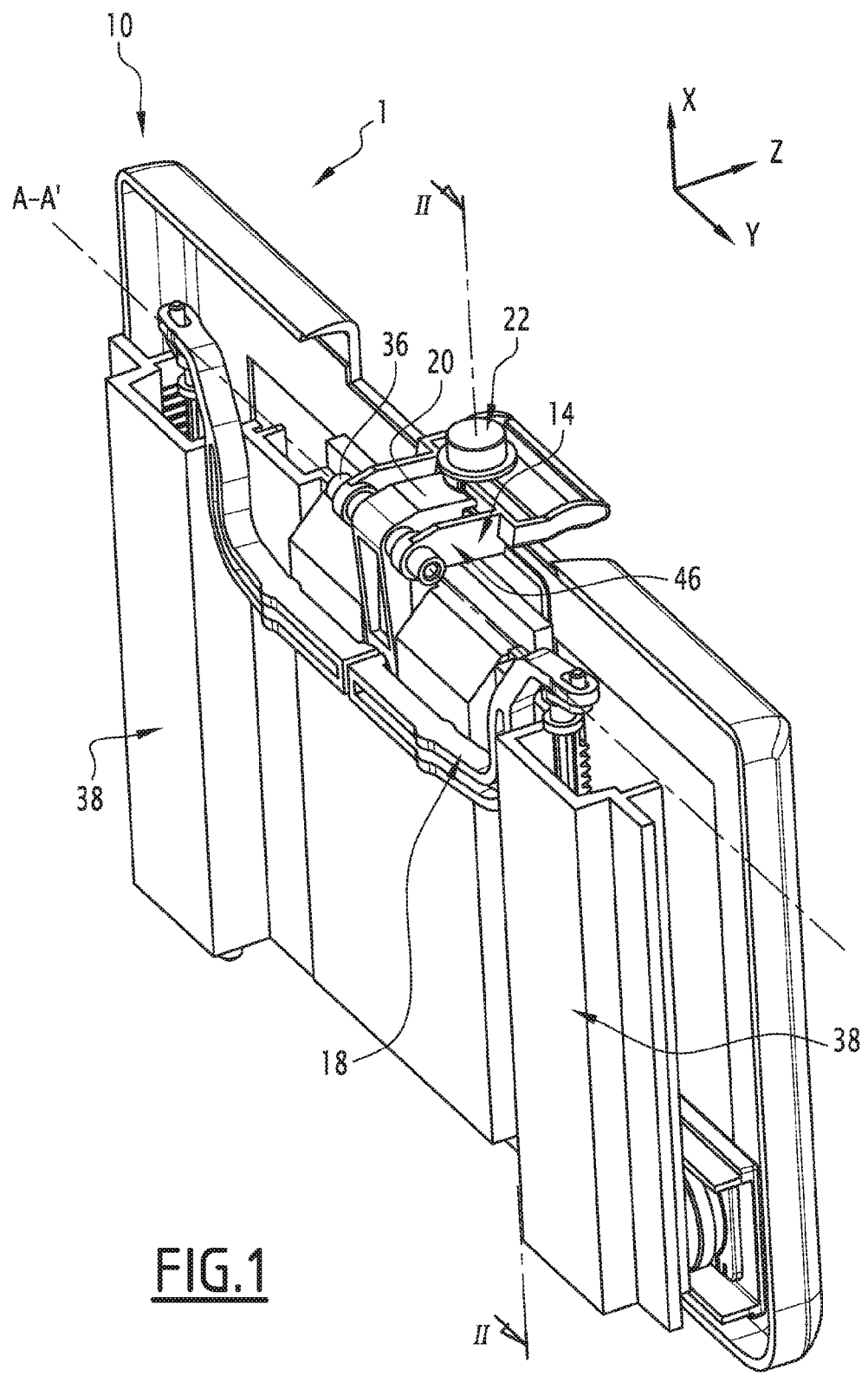
FIG. 1 is a diagrammatic perspective back view of part of the support according to an embodiment of the invention.

As shown in FIG. 1, the rear part of the second edge for example is substantially in the shape of a fork 46 having two parallel arms. The end of the arms of the fork 46 includes a housing in which the rod 36 is positioned. Part of the actuating device 20 is situated between the two arms of the fork 46, as will be described below.

The front part of the second edge 14 has a rib 48, a rear surface 50, a stop surface 52 and a shoulder 54.

The rib 48 has a shape complementary to the stationary part 35 of the base defining the opening 34.

The rear surface 50 is oriented facing the first arm of the actuating device.

The stop surface 52 and the shoulder 54 of the second edge have a function and form substantially similar to the stop surface 42 and the shoulder 44 of the first edge 12. The stop surface 52 is slightly curved relative to the shoulder 54. Furthermore, the stop surface is facing the stop surface of the first edge 12.

In its idle position, the rib 48 of the second edge 14 is in contact with the stationary part 35 of the base. The second edge 14 thus abuts against the stationary part and cannot be inclined past a maximum angle.

In its idle position, the second edge 14 is for example inclined by a maximum angle of 10° relative to the plane transverse to the main direction X.

In its maintaining position, the second edge 14 is for example in the plane transverse to the main direction.

In its maintaining position, the rib 48 of the second edge 14 defines, with the stationary part 35 of the base 10, a receiving space 56 for a locking pin.

The second edge 14 further comprises elastic return means, not shown, to bias the return of the second edge 14 toward the idle position of the apparatus 4.

The elastic return means for example exert a force F2 oriented toward the first edge 12 in the main direction.

In order to adapt the support 1 to any type of electronic apparatus 4, and in particular all lengths of those apparatuses 4, the distance between the first edge 12 and the second edge 14 is adjustable by translating the deployment arm 40 in the shaft 38.

The receiving space 16 of the apparatus 4 is delimited in the longitudinal direction by the stop surface 42 of the first edge 12 and by the stop surface 52 of the second edge 14.

The length of the receiving space 16 is adjustable due to the mobility of the deployment arm 40 in the shaft 38. The receiving space 16 is also defined by the bearing surface 46. The receiving space 16 is open facing the bearing surface 46, to allow the user to access the front face 6 of the apparatus 4.

The locking device 18 is movable between a locking position shown in FIG. 4, in which it prevents the translational movement of the first edge 12 relative to the second edge 14, and an unlocking position shown in FIGS. 2, 3 and 5, in which it allows the translation of the first edge 12 relative to the second edge 14.

The locking device 18 is biased toward its locking position.

The locking device 18 is for example a locking connecting rod making it possible to prevent the translation of the first edge 12 relative to the second edge 14 in the shaft. In particular as illustrated in FIG. 1, the connecting rod is able to move such that the locking device prevents the translation of the deployment arm.

For example, the locking device 18 maneuvers, via a crank, an arbor shaped in the form of a cam. The arbor actuates one or more brake pads that buttress on the shaft 38 in order to prevent the translation of the first edge 12.

The actuating device 20 is positioned in the housing 32 of the base 10. The actuating device 20 is mounted on the rod 36. The actuating device 20 is mounted rotatably relative to the rod 36 around the transverse axis A-A', independently of the second edge 14.

The actuating device 20 of the locking device 18 is movable between an inactive position, shown in FIG. 4, and an active position, illustrated in FIGS. 2, 3 and 5.

In the example shown in FIG. 1, the first arm of the actuating device is positioned between the arms of the shaft of the second edge.

The actuating device 20 comprises a first arm 60 designed to be in contact with the control device 22 and a second arm 62 designed to actuate the locking device 18.

The first arm 60 extends in a first direction between a connecting end with the second arm 62 and a free end 64 oriented facing the second edge 14. The first direction extends essentially in the direction Z.

The free end 64 of the first arm 60 comprises a sliding trough 66 for a locking pin emerging facing the second edge 14, a locking pin 68 and means for constraining the locking pin.

The connecting end of the first arm 60 for example comprises a hole allowing the passage of the rod 36.

The second arm 62 extends in a second direction between a connecting end with the first arm 60 and a free end oriented substantially downward. The second direction extends essentially along the direction X.

The first arm 60 and the second arm 62 are for example made from one part and a single piece. The first arm 60 and the second arm 62 are the secured in rotation and translation.

The first direction for example forms an angle of 90° with the second direction.

In the inactive direction of the actuating device 20, the first arm 60 is in a raised position, the first direction is substantially parallel to the depth direction Z. The second arm 62 is in a forward position. The second arm 62 is separated from the locking device 18. Thus, the second arm 62 does not exert pressure on the locking device 18. The locking device 18 is in its locking position.

In the active position of the actuating device 20, the first arm 60 is in a lowered position for example inclined by an angle close to 10° relative to the depth direction Z. The second arm 62 is in a contact position. The second arm 62 is in contact with the locking device 18. The second arm 62 exerts pressure on the locking device 18 that makes it possible to keep the locking device 18 in its unlocking position. The force exerted by the actuating device 20 in the active position on the locking device 18 is sufficient to prevent the locking device 18 from locking the translation of the deployment arm 40.

The locking pin 68 is movable between a retracted position shown in FIG. 2 and a deployed position shown in FIG. 5 in the trough 66 of the first arm 60.

The locking pin 62 is constrained toward a deployed position.

The constraint force F3 exerted by the constraint means of the locking pin 68 is suitable so that, when the locking pin 68 bears against the rear surface 50 of the second edge 14, the second edge 14 is secured in rotation with the actuating device 20.

The constraint force F3 is oriented in the first direction toward the second edge 14.

The dimensions and shape of the locking pin 68 are adapted so that the passage of the actuating device 20 from its inactive position, as shown in FIG. 4, to its active position, cause the locking pin 68 to slide on the rear surface 50 of the second edge 14, then to be deployed in the receiving space 56 of the locking pin 68, as shown in FIG. 5.

Furthermore, the actuating device 20 is able to be kept in its active position by the second edge 14, when the second edge 14 is in its idle position, by means of the locking pin 68, as shown in FIG. 3.

The passage of the second edge 14 from its idle position to its maintaining position drives the movement of the actuating device 20 from its active position shown in FIG. 3 to its inactive position shown in FIG. 4, by means of the force exerted by the locking pin 68 between the rear surface 50 of the second edge 14 and the actuating device 20.

Furthermore, the second edge is able to keep the actuating device in its inactive position when the second edge is in its maintaining position as shown in FIG. 4, by means of the force exerted by the locking pin 68 on the rear surface 50 of the second edge 14.

The locking pin 68 advantageously makes it possible to secure the passage of the second edge 14 from its idle position to its maintaining position upon rotation of the actuating device 20 from an active position to an inactive position. Furthermore, the locking pin 68 makes it possible to lock the second edge in its maintaining position, even when the actuating device 20 is brought back to its active position, as long as there is an apparatus 4 in the receiving space 16. This makes it possible to keep the second edge 14 in its maintaining position, as long as the user has not grasped or removed the apparatus.

The control device 22 is placed in the upper part 26 of the base 10 facing the orifice 30.

The control device is for example a button that can be actuated by pressure toward the first edge 12 along the main direction.

The control device 22 for example includes a cylindrical part having an outer surface 70 designed to be accessible from the passenger compartment and a lower rib 72 and a lug 74 protruding from the cylindrical part for the first arm 60. The lower rib 72 is designed to limit the translation of the control device 22 such that the device is not removed from the orifice 30.

The control device 22 is translatable relative to the base 10 between a disengagement position, shown in FIGS. 2, 3 and 5, and a released position, shown in FIG. 4.

The control device 22 further comprises elastic return means to bias the return of the control device from the released position to the disengagement position.

The elastic return means for example exert a force F4 oriented toward the first edge 12 along the main direction.

In the released position shown in FIG. 4, the outer surface 70 of the control device 22 protrudes relative to the trim surface 28 of the base 10. This position makes it possible to indicate that the support is in a maintaining configuration.

In the disengagement position shown in FIGS. 2, 3 and 5, the outer surface 70 of the control device 22 is in the plane of the trim surface 28 of the base.

The control device 22 is positioned such that the lug 74 is in contact with the first arm 60. Due to the return force, the lug 74 of the control device 22 is constrained against the first arm 60 of the actuating device. In this way, a translation of the control device 22 is able to pivot the actuating device 20.

The control device 22 is thus able to indicate the position of the actuating device 20 and therefore, indirectly, the position of the locking device 18. For example, the control device 22 in its released position makes it possible to indicate to the user that the apparatus 4 is indeed in place and that the locking device 18 is in its locked position.

The passage of the control device 22 from its released position shown in FIG. 4 to its disengagement position shown in FIGS. 2, 3 and 5 drives the passage of the actuating device 20 from its inactive position to its active position.

The control device 22 is in its released position shown in FIG. 4 only when the second edge is in the maintaining position.

The passage of the control device 22 from its disengagement position shown in FIG. 3 to its released position shown in FIG. 4 requires the application of the constraint forced by the second edge 14.

When the support 1 is in the idle configuration shown in FIG. 2, the control device 22 is in its disengagement position, the actuating device 20 is in its active position, the second edge 14 is in its idle position, the first edge 12 is in its closed position, and the locking pin 68 is in contact against the rear surface 50 of the second edge 14.

When the support 1 is in the maintaining configuration shown in FIG. 4 of the apparatus 4, the control device 22 is in its released position, the actuating device 20 is in its inactive position, the second edge 14 is in its maintaining position, the first edge 12 is in a separated position, and the locking pin 68 is against the rear surface 50 of the second edge 14.

When the support 1 is in the removal configuration shown in FIG. 5, the control device 22 is in its disengagement position, the actuating device 20 is in its active position, the second edge 14 is in its maintaining position, the first edge 12 is in a separated position, and the locking pin is in a deployed position in the receiving space 56.

The operation of the support 1 will now be described in light of FIGS. 2 to 5.

FIG. 2 shows an initial situation in which the electronic apparatus 4 is not yet positioned in the support 1 and the support 1 is in its idle configuration as described above.

To fasten an apparatus 4 in the support 1, the user presses the lower edge of the apparatus 4 against the bearing surface of the first edge 12 and exerts a downward pressure on the first edge 12. The force exerted is greater than the return force F1, such that the first edge 12 slides toward a separated position, which allows the apparatus to be inserted between the first edge 12 and a second edge 14. The separation between the two edges 12 and 14 is for example greater than the length of the apparatus 4.

When the separation is sufficient for placement of the apparatus 4, the user positions the upper edge of the apparatus 4 below the second edge 14 by rotating the apparatus 4, as shown in FIG. 3.

Under the effect of the return force F1, the first edge 12 comes closer to the second edge 14, i.e., the arm of the first edge slides in its shaft until the second edge 14 is in contact with the upper edge of the apparatus 4, then until the second edge 14 is moved toward the maintaining position, as shown in FIG. 4.

Thus, the second edge 14 for example rotates around the axis of the rod 36. This rotation of the second edge 14 simultaneously drives a rotation of the actuating device 20 by means of the locking pin 68 exerting a force against the rear surface 50 of the second edge 14. The rotation of the actuating device 20 causes it to go from the active position shown in FIG. 3 to the inactive position, as shown in FIG. 4.

The first arm 60 is turned toward its raised position and pushes the lug of the control device 22. The rotation of the actuating device 20 thus drives the passage of the control device 22 from its disengagement position to its released position. The locking device 18 goes from the unlocking positions to the locking position. The first edge 12 is immobilized in translation relative to the second edge 14.

The support 1 thus arrives in the configuration maintaining the apparatus 4, as shown in FIG. 4.

The apparatus is maintained between the two edges 12 and 14 of the support 1 with the front face 6 of the apparatus 4 accessible to the user.

Advantageously, the locking force and the force applied between the two edges 12, 14 is sufficient to prevent the untimely removal of the apparatus 4 as long as the support 1 is locked.

The outer surface of the control device 22 protrudes relative to the trim surface 28.

The control device 22 in its released position therefore makes it possible to indicate to the user that the apparatus 4 is indeed in place and that the locking device 18 is in its locked position. In that position, the apparatus 4 cannot be removed by translating the first edge 12 relative to the second edge 14.

Furthermore, the locking device 18 remains constrained in a locking position, since the actuating device 20 is inactive.

When the user wishes to remove the apparatus 4, he exerts pressure on the outer surface 70 of the control device 22, until the outer surface 70 is in the continuation of the trim surface 28 of the base 10. The control device 22 thus goes from its released position to its disengagement position. The support 1 thus goes to the removal configuration as illustrated in FIG. 5.

The passage of the control device 22 from its released position to its disengagement position causes the actuating device 20 to go from its inactive position to its active position while keeping the second edge in its maintaining position. Indeed, the lug 74 of the control device 22 pushes the first arm 60 of the control device 20. The control device 22 thus drives the rotation of the actuating device 20 around the axis A-A' from its inactive position to its active position.

Furthermore, the actuating device 20 going from its inactive position to its active position, the locking device 18 goes from its locking position to its unlocking position. Indeed, the second arm 62 is moved during the rotation toward a contact position. The first edge 12 is freely translating relative to the second edge 14. Furthermore, the first edge 12 remains maintained against the apparatus 4 due to the constraint force F 1.

The rotation of the actuating device 20 drives the sliding of the locking pin 68 along the rear surface 50 of the second edge 14. During this sliding, the locking pin 68 is partially retracted in the trough 66. At the end of the travel of the control device, the locking pin 68 is received in the rotation space 56, where it is deployed.

The rotation of the actuating device 20 therefore drives the placement of the locking pin 68 in the receiving space 56 between the second edge 14 and the stationary part 35. The locking pin 68 deployed in that space 56 serves as a stop. In fact, it keeps the actuating device 20 and the second edge 14 in their respective positions.

The second edge 14 is maintained in its maintaining configuration due to the presence of the apparatus 4.

Furthermore, the presence of the locking pin 68 in the receiving space 56, as shown in FIG. 5, prevents the rotation of the second edge 14 toward its idle position and the rotation of the actuating device 20 toward its inactive position. Furthermore, the return of the actuating device 20 toward an inactive position being prevented, the control device 22 remains in the disengagement position, as shown in FIG. 5. Thus, the control device 22 remains maintained in a disengagement position owing to the force F4.

To remove the apparatus, the user translates the first edge 12 toward a separated position, for example by pressing on the apparatus 4, then tilting it. The translation is allowed, since the locking device 18 is in its unlocking position.

Furthermore, the second edge 14 no longer being kept in its maintaining position by the apparatus 4, it switches from its maintaining position to its idle position due to the force F2. The switching of the second edge 14 from its maintaining position to its idle position causes a partial retraction of the locking pin 68 in the trough 66. Indeed, the receiving space 56 closes due to the switching of the second edge and the complementary shapes of the end of the locking pin 68 and the stationary part 35 of the base in the form of a bevel. The locking pin 68 is constrained by its constraint force F3 against the rear surface 50 of the second edge.

When the user no longer exerts a force on the first edge 12, the first edge 12 rises toward a close position.

The support thus returns to an idle configuration, as shown in FIG. 2.

It should be noted that the return force F1 of the first edge 12 is greater than the return force F2 to the idle configuration of the second edge 14. Indeed, when the first edge 12 is freely translating relative to the second edge 14 and there is an apparatus 4 connecting the first edge 12 to the second edge 14, the second edge is constrained toward its maintaining position.

It should be noted that the passage from the maintaining position as shown in FIG. 5 to the idle position of the second edge 14 involves a force F2 greater than the deployment constraint force F3 of the locking pin 68. Indeed, when the second edge 14 returns from its maintaining position to its idle position, the locking pin 68 is driven out of the receiving space 56, which closes.

Furthermore, the passage of the second edge 14 from its idle configuration to its maintaining configuration, which is under the control of the force of the first edge F1, allows the driving of the actuating device 20 by means of the locking pin 68; the deployment constraint force F3 is therefore adapted to that movement.

The passage of the actuating device 20 from its active position to its inactive position requires going against the constraint force of the control device 22. The forces are therefore adapted to the different dynamic situations.

Owing to the invention, the support 1 is suitable for closely maintaining electronic apparatuses 4 with variable dimensions, while allowing easy locking and unlocking.

For example, the installation, locking, unlocking or uninstallation of an apparatus can be done simply by a user, for example using a single hand. Indeed, the user can successively perform the uninstallation steps: once the user has pressed on the control device 22, the translation of the first edge 12 remains free until the next locking. It is not necessary for the user to press on the control device 22 at the same time to grasp the apparatus or place the apparatus.

Furthermore, the support 1 is compact and can be adapted to a small space.

The control device 22 makes it possible both to control the unlocking and indicate the status of the system.

Locking is automatic, but unlocking remains manual. The automatic locking makes it possible to best secure the support 1, since it does not require any user intervention. The support 1 is therefore practical and easy to use.

The invention is not limited to the embodiments described above.

The receiving space 16 of the apparatus 4 is for example designed to extend substantially vertically or to be slightly inclined relative to the vertical such that the front face 6 of the apparatus is optimally accessible to the occupants of the vehicle.

In a known manner, orientation means (not shown) for the support 1 are provided so as to allow positioning of the apparatus as desired by the user. In one embodiment, the base 10 includes an articulation making it possible to modify the orientation of the support 1.

Alternatively, the support 1 is used in fields other than the automotive industry.

Alternatively, the first edge 12 and the second edge 14 can be reversed. The upper part 26 bears the first edge 12 and the lower part 24 bears the second edge 14.

Alternatively, the first edge 12 and the second edge 14 can be lateral edges arranged to maintain the apparatus 4 by its sides.

The invention claimed is:

1. A support for a portable electronic apparatus in a vehicle, comprising:
   a first edge and a second edge, the first edge being movable relative to the second edge,
   a locking device movable between a locking position, in which it prevents the translation of the first edge relative to the second edge, and an unlocking position, in which it allows the movement of the first edge relative to the second edge, the locking device being constrained toward its locking position,
   an actuating device for actuating the locking device movable between an inactive position in which the locking device is in its locking position and an active position in which the actuating device keeps the locking device in its unlocking position,
   the second edge being movable between an idle position, in which the second edge is able to keep the actuating device in its active position, and a maintaining position, the transition of the second edge from its idle position to its maintaining position causing the movement of the actuating device from its active position to its inactive position, the actuating device being kept in its inactive position by the second edge in its maintaining position,
   wherein the support further comprises a control device movable between a released position and a disengagement position, the transition of the control device from its released position to its disengagement position causing the actuating device to go from its inactive position to its active position while keeping the second edge in its maintaining position.

2. The support according to claim 1, wherein the transition of the actuating device from its active position to its inactive position causes the control device to go from its disengagement position to its released position.

3. The support according to claim 1, wherein the transition of the control device from its disengagement position to its released position requires the passage of the second edge from the idle position to the maintaining position.

4. The support according to claim 1, wherein the actuating device is rotatable between the inactive position and the active position around an axis and the actuating device comprises a first arm extending in a first direction from a first free end to a connecting end, and a second arm extending in a second direction different from the first direction from the connecting end of the first arm to a second free end, the second arm being secured in rotation with the first arm relative to the axis.

5. The support according to claim 1, wherein the second edge includes a rear surface facing the actuating device, the actuating device comprising a locking pin movable between a retracted position and a deployed position and being constrained toward the deployed position by a force, the constraint force exerted being adapted so that, when the locking pin is deployed against the rear surface of the second edge, the second edge is secured in rotation with the actuating device.

6. The support according to claim 5, wherein the support includes a stationary part and wherein the second edge, in its maintaining position, defines, with the stationary part, a space for receiving the locking pin, the passage of the control device from its released position to its disengagement position causing the deployment of the locking pin in the receiving space, so as to keep the actuating device in its active position.

7. The support according to claim 1, wherein the control device is in its released position only when the second edge is in the maintaining position.

8. The support according to claim 1, wherein the first edge is translatable relative to the second edge between a closed position and a separated position, the first edge being constrained toward the closed position.

9. The support according to claim 1, wherein the control device comprises a lug, the lug being in contact with the actuating device.

10. A vehicle interior assembly comprising a support according to claim 1.

* * * * *